United States Patent [19]
Lee et al.

[11] Patent Number: 5,922,146
[45] Date of Patent: Jul. 13, 1999

[54] HYDROGEN-ABSORBING ALLOY OF ULTRA HIGH CAPACITY FOR ELECTRODE OF SECONDARY BATTERY

[75] Inventors: Jai-Young Lee, Taejon; Han-Ho Lee, Seoul; Ki-Young Lee; Jae-Han Jung, both of Taejon; Dong-Myung Kim, Kwangmyung; Ji-Sang Yu, Seoul, all of Rep. of Korea

[73] Assignee: Korea Advanced Institute of Science and Technology, Taejon, Rep. of Korea

[21] Appl. No.: 08/761,440

[22] Filed: Dec. 6, 1996

Related U.S. Application Data

[30] Foreign Application Priority Data

Dec. 8, 1995 [KR] Rep. of Korea ................. 95-47762

[51] Int. Cl.$^6$ ................................................. C22C 30/00
[52] U.S. Cl. ...................... 148/442; 420/580; 420/900; 252/182.1; 429/223; 429/224
[58] Field of Search ............... 429/59, 101, 223, 429/224; 423/644; 252/182.1; 148/419, 442; 420/900, 580

[56] References Cited

FOREIGN PATENT DOCUMENTS 05287422  11/1993  Japan .

OTHER PUBLICATIONS

S, Wakao & H. Sawa Effects of Partial Substitution and Anodic Oxidation Treatment of Zr–V–Ni Alloys on Electrochemical Properties, J.Less–Common Met., 172–174:1219–1226 (1991).

H. Sawa et al. Effects of Oxidation Treatment of Ti–Zr–Ni Hydride Electrodes Containing . . . , Z.Phys.Chem.N.F., 164:1527–1532 (1989).

S.-R. Kim & J.-Y. Lee, Activation Behaviour of ZrCrNiM. . . , J. Alloys and Compounds, 185:L1–L4 (1992).

CA125:91203 of J Alloys Compd, Jan. 1996.

Chem Abs 120: 327,471 of J. Alloys Compd., Jan. 1994.

*Primary Examiner*—George Wyszomierski
*Attorney, Agent, or Firm*—Darby & Darby

[57] ABSTRACT

The present invention provides a hydrogen-absorbing alloy system of ultra high capacity for electrode of secondary battery. In accordance with the present invention, the hydrogen-absorbing Ti alloy system is represented as a following general formula:

$$Ti_A Zr_B V_C Mn_D Ni_E M_F$$

wherein, M represents at least one metal which is selected from the group consisting of Cr, Co, Fe, Cu, Al, Si, Hf, Nb, Mo and R.E., where R.E. represents at least one metal which is selected from the group of rare-earth elements consisting of La, Ce, Pr, Nd and Sm; and, A, B, C, D, E and F have atomic ratios ranging $0.2 \leq A \leq 0.35$, $0.03 \leq B \leq 0.15$, $0.15 \leq C \leq 0.4$, $0.8 \leq D \leq 0.2$, $0.13 \leq E \leq 0.35$ and $0 \leq F \leq 0.1$, respectively, with the proviso that $A+B+C+D+E+F=1$ and $A+B \leq 0.45$. The hydrogen-absorbing Ti alloy system of the invention, has molar molecular weight of 50 to 65 g/mol, C14-hexagonal crystalline structure of single phase, lattice constant of a: 4.902–5.004 Å and c: 7.972–8.168 Å, ultra high discharge capacity of 400 mAh/g or more, which can be employed as an anode material of a Ni—MH secondary battery.

4 Claims, 2 Drawing Sheets

HYDROGEN-ABSORBING ALLOY OF ULTRA HIGH CAPACITY FOR ELECTRODE OF SECONDARY BATTERY

FIELD OF THE INVENTION

The present invention relates to a hydrogen-absorbing Ti alloy system, more specifically, to a hydrogen-absorbing Ti alloy system having C14-hexagonal crystalline structure of single phase and ultra high discharge capacity, which can be employed as an anode material of a Ni—MH(nickel-metal hydride) secondary battery.

BACKGROUND OF THE INVENTION

In general, a Ni—MH secondary battery in which a hydrogen-absorbing alloy is employed as an anode material, works on a reaction principle as followings: In the course of electric: discharge of a battery, hydrogen atoms within the hydrogen-absorbing alloy bind to OH$^-$ ions of KOH electrolyte to give water, and electrons simultaneously move to a cathode through external circuit. During electric charging, water is electrolysed to give H$^+$ and OH$^-$ ions, where OH$^-$ ions stay in the electrolyte, and H$^+$ ions bind to influxed electrons to give hydrogen atoms, which, in turn, bind to the hydrogen-absorbing alloy finally to be stored within the alloy. This reaction occurred, based on the properties of hydrogen-absorbing alloy that it is stable in an alkaline solution and absorbs/releases a lot of hydrogen rapidly and reversibly.

In order to use the hydrogen-absorbing alloy system as an anode material of a Ni—MH secondary battery, the alloy system should meet following requirements: First, the hydrogen-absorbing alloy has to possess hydrogenation properties such as proper hydrogen absorption-desorption pressure in a solid-gas reaction (generally, 0.01 to 1 atmosphere at room temperature), rapid hydrogenation rate, and a high hydrogen-absorbing capacity(a theoretical discharge capacity of an electrode is proportional to a hydrogen-absorbing capacity ($C_H$(wt. %)): a theoretical discharge capacity (mAh/g)=268×$C_H$)). Secondly, charge transfer associated with the oxidation and reduction of hydrogen at the interface between the alloy and the KOH electrolyte, has to occur easily during the electrochemical reaction of the alloy and the electrolyte. Accordingly, only the hydrogen-absorbing alloy whose surface functions as a catalyst for charge transfer reaction can be used as an anode material of a Ni—MH secondary battery.

So far, many hydrogen-absorbing alloy systems satisfying the said requirements have been reported, whose examples includes: AB$_5$ type-hexagonal structure of La—Nd—Ni—Co—Al alloy system (see: U.S. Pat. No. 4,488,817); Mm—Mn—Ni—Co—Al alloy system (see: JP 61-1132501; JP 61-214361); Ti—V—Ni—Cr alloy system of AB$_2$ type-C14,15-hexagonal and BCC (body-centered cubic lattice) multiphase structure (see: U.S. Pat. No. 4,551,400); Zr—V—Ni alloy system of C14 structure (see: J. of the Less-Common Metals, 172–174:1219 (1991)); and, Zr—Cr—Mn—Ni alloy system of C14, C15 structure (see: J. of the Less-Common Metals, 172–174:1211(1991)).

Among the said alloy systems, La-Ni electrode of AB$_5$ type shows highly reduced capacity during charge/discharge cycling in an alkaline electrolyte (see: J. of the Less-Common Metals, 161:193(1990); J. of the Less-Common Metals, 155:119(1989)), which is called as "degradation". J. J. G. Willems et al. have substituted a small amount of Ni with Co, Al, and a small amount of La with Nd to increase durability for charge/discharge cycling, while it results in the reduction of capacity (see: U.S. Pat. No. 4,488,817).

On the contrary, it has been reported that electroless hydrogen-absorbing alloy powder with copper results in an increase in the durability for charge/discharge cycling without the reduction of capacity (see: J. of the Less-Common Metals, 107:105(1985)). However, the said method essentially accompanies a step of plating and environmental pollution caused by solutions employed therein.

On the other hand, it has been found that hydrogen-absorbing alloy of AB$_2$ type has a discharge capacity of 300 mAh/g or more, which is higher than that of AB$_5$ type alloy, and has a good durability for charge/discharge cycling without a step of plating (see: J. of the Less-Common Metals, 172–174:1175(1991); J. of the Less-Common Metals, 180:37(1992)).

In addition, T. Gamo et al. discloses a hydrogen-absorbing Z-based alloy system which comprises Zr over 30 at. % and Ni over 40 at. % and has a discharge capacity of 300 to 370 mAh/g (see: U.S. Pat. No. 4,946,646). Also, K. Hong and M. A. Fechenko et al. teaches a hydrogen-absorbing alloy system of Ti—Zr—V—Ni—Cu—Mn—M (M=Al, Co, Fe, etc.) having a discharge capacity of 300 to 380 mAh/g (see: U.S. Pat. No. 4,849,205; U.S. Pat. No. 4,728,586; U.S. Pat. No. 4,551,400).

All of the said conventional hydrogen-absorbing alloys are, however, proven to be less satisfactory in the sense that they have discharge capacities of 250 to 320 mAh/g (AB$_5$ type) and 300 to 380 mAh/g (AB$_2$ type), which are lower than 400 mAh/g.

Recently, in accordance with the advent of electric vehicles and electronic machines such as cellular phone, notebook computer and camcorder, etc., and tendency of miniaturization of the electronic machines, there are strong reasons for exploring and developing alternative batteries of high capacity. However, a hydrogen-absorbing capacity of AB$_5$ type alloy can not reach to 1.2 wt % (a discharge capacity of 320 mAh/g) or more, since the alloy has a molar ratio of A$_{1/6}$B$_{5/6}$ and a molar molecular weight of 72 g/mol. Also, a hydrogen-absorbing capacity of Z-based alloy system, among the AB$_2$ type alloys, can not reach to 1.4 wt % (a discharge capacity of 400 mAh/g) or more, since the alloy has a molar ratio of A$_{1/3}$B$_{2/3}$ and a molar molecular weight of 67 g/mol. Therefore, needs have continued to exist for the development of a new hydrogen-absorbing alloy having a discharge capacity over 400 mAh/g, since further increase in the energy density of a battery can not be expected in the conventional hydrogen-absorbing alloys.

Accordingly, the hydrogen-absorbing alloy of light weight has to be used in order to down the molar molecular weight of the hydrogen-absorbing alloy to be under 65 g/mol, whose examples include alloy systems comprising Mg, V and Ti elements. However, the Mg alloy system can not be used for an electrode, since it has low hydrogen-absorption/desorption pressure at room temperature and slow hydrogenation rate. Although the V alloy system, which is substituted with a small amount of Ti and Zr, has proper hydrogen-absorption/desorption pressure of 0.01–1 atm at room temperature, it can not be used for an electrode, since it can not function as a catalyst of charge transfer reaction.

On the other hand, the hydrogen-absorbing Ti alloy system has been evaluated as a proper hydrogen-absorbing material, since it has a large hydrogen-absorbing amount (about 1.96 wt % $H_2$/alloy(g)) and high reaction rate. In this connection, T. Gamo suggests a hydrogen-absorbing Ti alloy system (see: U.S. Pat. No. 4,144,103; U.S. Pat. No. 4,160,014), however, it has a relatively high hydrogen equilibrium pressure of 5 to 10 atm and whose surfaces can not function as catalysts of charge transfer reaction in KOH electrolyte. Therefore, the alloy system can not be practically applied as an anode material of a secondary battery.

SUMMARY OF THE INVENTION

The present inventors have made an effort to solve the said problems of the conventional hydrogen-absorbing Ti alloy systems. They carried out partial substitution of Ti with V and Zr in a hydrogen-absorbing Ti—Mn alloy system to increase a hydrogen-absorbing capacity and control hydrogen-absorption/desorption equilibrium pressure to be 0.01 to 1 atm. In addition, they added a small amount of Ni or partially substituted Mn with Ni to improve the stability in KOH electrolyte and the catalytic function, and further added at least one metal which is selected from the group consisting of Cr, Co, Fe, Cu, Al, Si, Hf, Nb, Mo and R.E.(rare-earth elements), as the 6th and 7th elements in a small amount. Thus, they finally obtained a hydrogen-absorbing alloy system which meets two requirements of an electrode material, i.e., proper hydrogenation properties in a solid-gas reaction and proper electrochemical reaction within the electrolyte for a anode electrode of a Ni—MH secondary battery, which has C14-hexagonal crystalline structure of single phase, proper hydrogen-absorption/desorption equilibrium pressure, catalytic function of charge transfer reaction, high hydrogen-absorbing capacity, high reaction rate and light weight, which can be used as an anode material of a Ni—MH secondary battery.

A primary object of the present invention is, therefore, to provide a novel hydrogen-absorbing Ti alloy system having C14-hexagonal crystalline structure of single phase and ultra high discharge capacity, which can be employed as anode material of a Ni—MH secondary battery.

BRIEF DESCRIPTION OF DRAWINGS

The above and the other objects and features of the present invention will become apparent from the following description given in conjunction with the accompanying drawings, in which.

DETAILED DESCRIPTION OF THE INVENTION

Figure 1A:
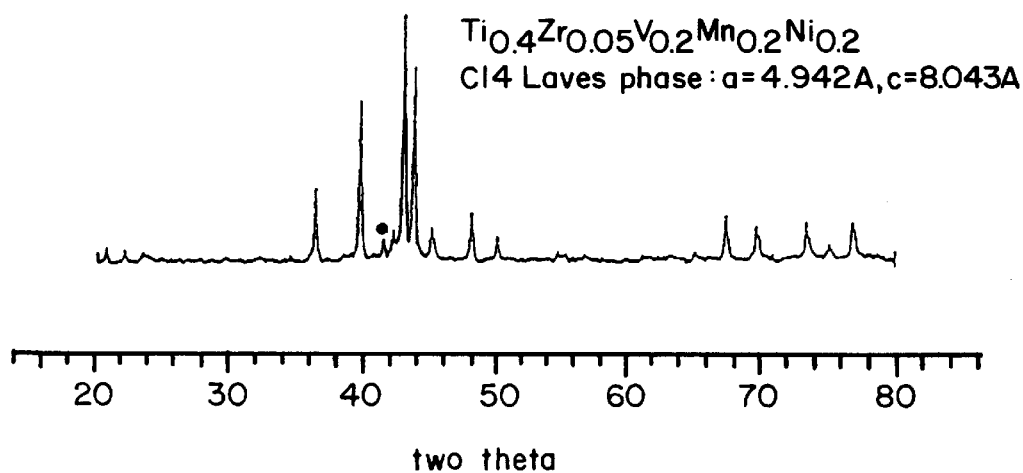
FIG. 1(A) is a graph showing X-ray diffraction pattern for $Ti_{0.4}Zr_{0.05}V_{0.2}Mn_{0.2}Ni_{0.2}$ alloy system.

In accordance with the present invention, the hydrogen-absorbing Ti alloy system is represented as a following general formula:

$$Ti_A Zr_B V_C Mn_D Ni_E M_F$$

wherein,
M represents at least one metal which is selected from the group consisting of Cr, Co, Fe, Cu, Al, Si, Hf, Nb, Mo and R.E.,
where R.E. represents at least one metal which is selected from the group of rare-earth elements consisting of La, Ce, Pr, Nd and Sm; and,
A, B, C, D, E and F have atomic ratios ranging $0.2 \leq A \leq 0.35$, $0.03 \leq B \leq 0.15$, $0.15 \leq C \leq 0.4$, $0.08 \leq D \leq 0.2$, $0.13 \leq E \leq 0.35$ and $0 \leq F \leq 0.1$, respectively,
with the proviso that $A+B+C+D+E+F=1$ and $A+B \leq 0.45$.

As a preferred embodiment of the present invention, a hydrogen-absorbing Ti alloy system is represented as a following general formula(I):

$$Ti_A Zr_B V_C Mn_D Ni_E \quad (I)$$

wherein,
A, B, C, D and E have atomic ratios ranging $0.2 \leq A \leq 0.35$, $0.03 \leq B \leq 0.15$, $0.15 \leq C \leq 0.4$, $0.08 \leq D \leq 0.2$ and $0.13 \leq E \leq 0.35$, respectively, with the proviso that $A+B+C+D+E=1$ and $A+B \leq 0.45$.

Most preferred embodiments of the hydrogen-absorbing Ti alloy system of the invention are as follows:

$Ti_{0.20}Zr_{0.13}V_{0.20}Mn_{0.17}Ni_{0.30}$;
$Ti_{0.20}Zr_{0.14}V_{0.20}Mn_{0.11}Ni_{0.35}$;
$Ti_{0.23}Zr_{0.10}V_{0.20}Mn_{0.17}Ni_{0.30}$;
$Ti_{0.26}Zr_{0.07}V_{0.24}Mn_{0.20}Ni_{0.23}$;
$Ti_{0.27}Zr_{0.07}V_{0.17}Mn_{0.17}Ni_{0.32}$;
$Ti_{0.27}Zr_{0.07}V_{0.18}Mn_{0.17}Ni_{0.31}$;
$Ti_{0.28}Zr_{0.07}V_{0.22}Mn_{0.18}Ni_{0.25}$;
$Ti_{0.30}Zr_{0.30}V_{0.17}Mn_{0.17}Ni_{0.33}$;
$Ti_{0.30}Zr_{0.03}V_{0.20}Mn_{0.17}Ni_{0.30}$; and,
$Ti_{0.35}Zr_{0.04}V_{0.18}Mn_{0.30}Ni_{0.13}$.

As the other preferred embodiment of the present invention, a hydrogen-absorbing Ti alloy system is represented as a following general formula(II):

$$Ti_A Zr_B V_C Mn_D Ni_E M_F \quad (II)$$

wherein,
M represents at least one metal which is selected from the group consisting of Cr, Co, Fe, Cu, Al, Si, Hf, Nb, Mo and R.E.,
where R.E. represents at least one metal which is selected from the group of the rare-earth elements consisting of La, Ce, Pr, Nd and Sm; and,
A, B, C, D, E and F have atomic ratios ranging $0.2 \leq A \leq 0.35$, $0.03 \leq B \leq 0.15$, $0.15 \leq C \leq 0.4$, $0.08 \leq D \leq 0.2$, $0.13 \leq E \leq 0.35$ and $0 < F \leq 0.1$, respectively, with the proviso that $A+B+C+D+E+F=1$ and $A+B \leq 0.45$.

Most preferred embodiments of the hydrogen-absorbing Ti alloy system of the invention are as follows:

$Ti_{0.20}Zr_{0.04}V_{0.40}Mn_{0.15}Ni_{0.15}Co_{0.05}$;
$Ti_{0.26}Zr_{0.07}V_{0.24}Mn_{0.10}Ni_{0.20}Cr_{0.10}$;
$Ti_{0.26}Zr_{0.04}V_{0.24}Mn_{0.10}Ni_{0.25}Hf_{0.05}$;
$Ti_{0.26}Zr_{0.07}V_{0.24}Mn_{0.10}Ni_{0.25}Mo_{0.05}$;
$Ti_{0.26}Zr_{0.07}V_{0.24}Mn_{0.10}Ni_{0.25}Nb_{0.05}$;
$Ti_{0.27}Zr_{0.07}V_{0.21}Mn_{0.14}Ni_{0.27}Cr_{0.04}$;
$Ti_{0.27}Zr_{0.07}V_{0.21}Mn_{0.14}Ni_{0.27}Co_{0.04}$;
$Ti_{0.27}Zr_{0.07}V_{0.21}Mn_{0.14}Ni_{0.27}Cu_{0.04}$;
$Ti_{0.27}Zr_{0.07}V_{0.21}Mn_{0.14}Ni_{0.27}Al_{0.04}$; and, $Ti_{0.27}Zr_{0.07}V_{0.21}Mn_{0.14}Ni_{0.27}Si_{0.04}$.
$Ti_{0.27}Zr_{0.07}V_{0.21}Mn_{0.14}Ni_{0.27}Fe_{0.04}$;
$Ti_{0.27}Zr_{0.07}V_{0.21}Mn_{0.13}Ni_{0.27}Co_{0.06}$;
$Ti_{0.28}Zr_{0.07}V_{0.20}Mn_{0.15}Ni_{0.25}R.E._{0.05}$ (R.E.=rare-earth elements); $Ti_{0.28}Zr_{0.07}V_{0.22}Mn_{0.10}Ni_{0.25}Cr_{0.04}$; and, $Ti_{0.28}Zr_{0.07}V_{0.22}Mn_{0.10}Ni_{0.25}Al_{0.08}$.

The hydrogen-absorbing Ti alloy system of the invention has C14-hexagonal crystalline structure of single phase, hydrogen-absorbing capacity of Ni—MH 1.5 wt % or more, i.e., discharge capacity of 400 mAh/g or more, and light molar molecular weight of 50 to 65 g/mol. Also, lattice constants of the hydrogen-absorbing alloy system of the invention are as follows: a: 4.902–5.004 Å, c: 7.972–8.168 Å.

In the hydrogen-absorbing alloy system, Ti is a basic element, whose optimum atomic ratio ranges 0.2 to 0.35, considering the composition ratios of the substituted metal elements, i.e., V and Zr. If the composition ratio deviates from the optimum ratios, a hydrogen-absorbing capacity decreases too much, or BCC phase increases, which, in turn, results in a decrease of a hydrogen-absorbing capacity.

In the hydrogen-absorbing alloy system, Zr whose optimum atomic ratio ranges 0.03 to 0.15, leads to decrease in ratio of BCC phase and increase in lattice size. If the composition ratio deviates from the optimum ratio, the ratio of BCC phase determining crystalline structure of the alloy increases, which gives rise to a structure of multiphase, decreased discharge capacity under 400 mAh/g and increased hydrogen equilibrium pressure of above 1 atm.

In the hydrogen-absorbing alloy system, an optimum atomic ratio of V ranges 0.15 to 0.4. Since V has a low affinity for hydrogen, partial substitution of Ti with V leads to decreased hydrogen-absorbing amount, and hydrogen-absorbing capacity are increased, decreased and reincreased, which are caused by a relative ratio between BCC phase of Ti—V having no reversible hydrogen absorption/desorption activity and C-14 hexagonal structure of Ti—V—Mn having reversible hydrogen absorption/desorption activity.

In the hydrogen-absorbing alloy system, an optimum atomic ratio of Mn ranges 0.08 to 0.2. If the atomic ratio of Mn is lower than 0.08, a ratio of BCC phase increases in the crystalline structure, which results in a remarkable decrease of the reversible hydrogen-absorbing capacity. If the atomic ratio of Mn is higher than 0.2, the composition ratio of Ni which is the substituted metal element, decreases, which results in a decrease of the stability in the KOH electrolyte and the catalytic function.

In the hydrogen-absorbing alloy system, Ni is an element conferring the stability in the KOH electrolyte and the catalytic function, whose optimum atomic ratio ranges 0.15 to 0.35.

The 6th and 7th elements can be further added to the hydrogen-absorbing alloy system of the invention, which are selected from the group consisting of Cr, Co, Fe, Cu, Al, Si, Hf, Nb, Mo and R.E. (rare-earth elements such as La, Ce, Pr, Nd and Sm), in a minimum amount under 10 wt %, so that BCC phase does not appear in the hydrogen-absorbing alloy system.

Samples of the hydrogen-absorbing alloys of the invention are prepared and characterized.

(1) Method of securing hydrogenation properties in a solid-gas reaction

Based on the atomic ratios of elements composing the hydrogen-absorbing alloys, each elements were weighed for the total weight of 5 g, and arc melted in an argon atmosphere. In this connection, in order to improve homogeneity of the samples, they were overturned after congelation of the melted samples and melted again for 4 to 5 times. Then, the samples were ground and 100 to 200 mesh of the samples were added to the reaction tube, which was connected to the high-pressure hydrogen apparatus of Sievert's type. Activation was carried out by maintaining the pressure within the reaction tube to reach the level of about $10^{-2}$ torr for 30 minutes and adding hydrogen of about 20 atm without heat treatment, by which hydrogen absorption was completed in 1 hour. Then, the reaction tube was vacuumized to release hydrogen in the samples. The hydrogen absorption-desorption was repeated 3 to 4 times to complete the step in several minutes. After activation, a constant temperature in the hydrogen injection apparatus including the reaction tube was maintained, employing an automatic temperature controller. Then, a curve for the hydrogen equilibrium pressure in accordance with the hydrogen composition during the hydrogen absorption-desorption at a temperature was obtained. Thus, thermodynamic properties such as hydrogen absorption capacity and plateau pressure, etc. were obtained from the curve.

(2) Method of measuring properties of the hydrogen-absorbing alloys in an alkaline electrolyte Based on the desired composition, pure metals were weighed, and melted in an argon atmosphere to prepare hydrogen-absorbing alloys. The alloy samples thus prepared were ground mechanically, mixed with copper or nickel powder and TEFLON powder, and moulded by pressing to prepare electrodes. The electrodes were dipped in 30 wt % KOH electrolyte, and platinum or nickel was used as a counter-electrode to construct a half-cell. Constant current was driven to run between the two electrodes employing an ammeter, to inject hydrogen into the electrode. During electric discharge, the two electrodes were exchanged each other, and current was driven to run. In this connection, in order to measure a voltage of electrode of the hydrogen-absorbing alloy, a mercury oxide electrode (Hg/HgO) was used as a reference electrode. A discharge capacity is represented as ampere capacity per unit weight during the discharge with a constant current.

The present invention is further illustrated by the following examples, which should not be taken to limit the scope of the invention.

Reference Example 1: Ti—V—Mn alloy system

In Ti—Mn alloy system, Ti was partially substituted with V element having a low affinity for hydrogen (–37 kJ/mol), and hydrogenation properties and microstructures of the alloys were observed, which were summarized in Table 1 below.

TABLE 1

Hydrogenation properties and microstructures in Ti—Mn and Ti—V—Mn alloy systems

| Ti—V—Mn | Hydrogen-absorbing amount/amount of reversible hydrogen (wt %) | Plateau pressure at 30° C. (atm) | microstructure | |
|---|---|---|---|---|
| | | | BCC | C14 |
| $Ti_{0.6}Mn_{0.4}$ | 2.76/0.39 | 0.1–2 | 70% | 30% |
| $Ti_{0.4}V_{0.2}Mn_{0.4}$ | 2.33/1.41 | 0.1–1 | 15% | 85% |
| $Ti_{0.35}V_{0.25}Mn_{0.4}$ | 2.1/0.75 | 0.1–0.7 | 67% | 33% |
| $Ti_{0.3}V_{0.3}Mn_{0.4}$ | 1.96/0.9 | 0.1–0.5 | 50% | 50% |
| $Ti_{0.25}V_{0.35}Mn_{0.4}$ | 1.92/0.8 | 0.01–0.2 | 60% | 40% |
| $Ti_{0.2}V_{0.4}Mn_{0.4}$ | 1.9/1.62 | 0.5–1 | 5% | 95% |
| $Ti_{0.3}V_{0.4}Mn_{0.3}$ | 2.45/0.2 | 0.1< | 100% | 0% |
| $Ti_{0.4}V_{0.3}Mn_{0.3}$ | 1.9/0.5 | 0.1< | 100% | 0% |

As can be seen in Table 1, partial substitution of Ti with V led to a decrease of hydrogen-absorbing amount and an increase, a decrease, or a re-increase of reversible hydrogen-absorbing capacity. The pattern of changes in the hydrogenation properties corresponded to a relative ratio between BCC phase of Ti—V having no reversible hydrogen absorption/desorption activity and Ti—V—Mn phase of C-14 hexagonal structure having reversible hydrogen absorption/desorption activity, in a view of the data obtained from the X-ray diffraction studies.

On the other hand, as shown in Table 1, if an atomic ratio of Mn is lower than 0.03, BCC phase dominates independently on the substitution of V, which results in a remarkable decrease of the reversible hydrogen-absorbing capacity. Accordingly, in order to improve the hydrogenation properties(a very small amount of reversible hydrogen and high pressure) of the Ti—Mn alloy system, e.g., $Ti_{0.6}Mn_{0.4}$ alloy, having a very large hydrogen-absorbing amount and a low hydrogen-absorbing capacity, Mn and V elements have to be substituted with other elements to elevate the ratio of C14-hexagonal phase.

Reference Example 2: Ti—V—Mn—Ni alloy system

Hydrogenation properties of the Ti—V—Mn alloy system in Reference Example 1, in the course of solid-gas reaction, were investigated. As a result, it was found that: hydrogen-absorption/desorption in the electrolyte did not occur, while hydrogenation properties of the alloys were proper for electrode materials. The said phenomena occurs since the elements constituting the alloy system, i.e., Ti, V and Mn, play a little catalytic role in the charge transfer in the electrolyte, atmospheric oxygen is easily oxidized by $OH^-$ ion, etc. in the electrolyte or forms a membrane of the passive state, thus hydrogen is not absorbed into the alloys but released as gas.

Accordingly, Mn in the Ti—V—Mn alloy system was substituted with Ni element having a relatively high stability and catalytic function in the KOH electrolyte, as the 4th element composing alloy system, to prepare Ti—V—Mn—Ni alloy system, and hydrogenation properties and discharge capacities were investigated. As a result, it was determined that the Ti—V—Mn—Ni alloy system can absorb/desorb hydrogen in the electrolyte (see: Table 2).

TABLE 2

Hydrogenation properties and discharge capacities of Ti—V—Mn and Ti—V—Mn—Ni alloy systems

| Alloy system | Properties of solid-gas reaction | | Electrochemical discharge capacity | | |
|---|---|---|---|---|---|
| | Hydrogen-absorbing capacity (wt. %) | Plateau pressure at 30° C. (atm) | 1 cycle | 10 cycles | 50 cycles |
| $Ti_{0.4}V_{0.2}Mn_{0.4}$ | 1.41 | 0.1–1 | 0 | 0 | 0 |
| $Ti_{0.4}V_{0.2}Mn_{0.2}Ni_{0.2}$ | 0.95 | 0.5–2.5 | 183 | 201 | 204 |
| $Ti_{0.2}V_{0.4}Mn_{0.4}$ | 1.62 | 0.5–1 | 0 | 0 | 0 |
| $Ti_{0.2}V_{0.4}Mn_{0.2}Ni_{0.2}$ | 1.06 | 0.7–1.6 | 207 | 225 | 227 |

Reference Example 3: Ti—Zr—V—Mn—Ni alloy system

Figure 1B:
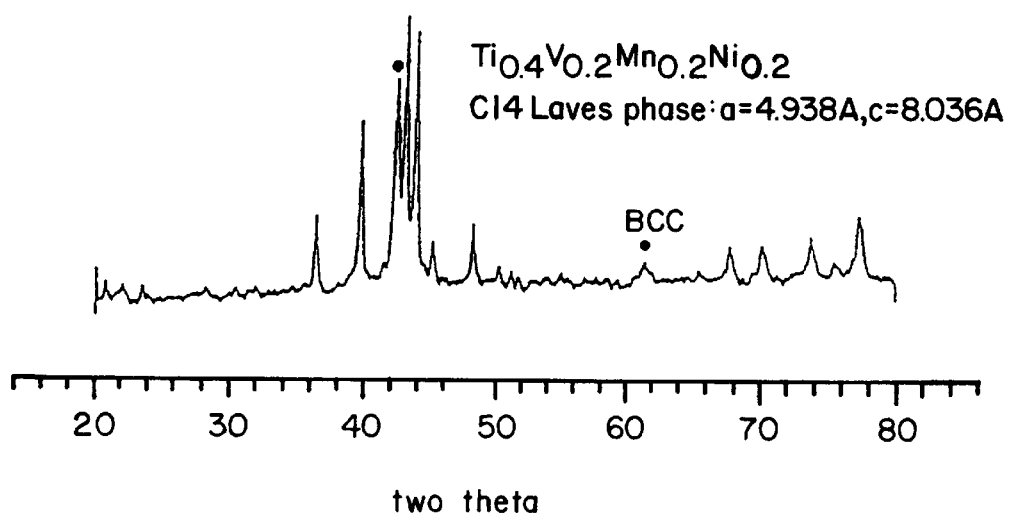
FIG. 1(B) is a graph showing X-ray diffraction pattern for $Ti_{0.4}V_{0.2}Mn_{0.2}Ni_{0.2}$ alloy system.
Figure 1C:
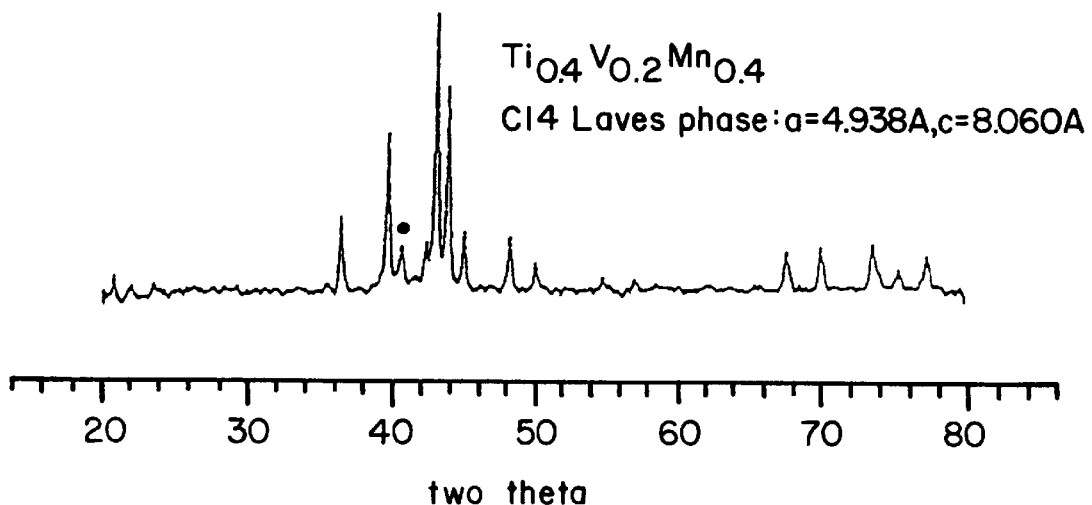
FIG. 1(C) is a graph showing X-ray diffraction pattern for $Ti_{0.4}V_{0.2}Mn_{0.4}$ alloy system.

As can be seen in Table 2, it was found that Ti—V—Mn—Ni alloy system can absorb/desorb hydrogen in the electrolyte, in contrast to the case of Ti—V—Mn alloy system. However, the alloys were found to be improper for electrode materials, since their hydrogen-absorbing capacities decreased drastically and their plateau pressure increased. The results are demonstrated in FIGS. 1(A), 1(B) and 1(C). FIGS. 1(A), 1(B) and 1(C) show X-ray diffraction patterns for $Ti_{0.4}Zr_{0.05}V_{0.2}Mn_{0.2}Ni_{0.2}$, $Ti_{0.4}V_{0.2}Mn_{0.2}Ni_{0.2}$ and $Ti_{0.4}V_{0.2}Mn_{0.4}$ alloy systems, respectively. As shown in FIGS. 1(A), 1(B) and 1(C), substitution of Mn with Ni led to an increase of BCC phase to have a low hydrogen-absorbing capacity, and a decrease of lattice size of C14-hexagonal phase to result in a remarkable reduction of invasive area within the alloys permitting absorption of hydrogen. Thus, the equilibrium pressure increased. Therefore, in order to improve the properties of Ti—V—Mn—Ni alloy system, Ti was substituted partially with Zr element as the 5th element, or a small amount of Zr element was added. Then, changes in the hydrogen-absorbing capacity and hydrogen equilibrium pressure were investigated and summarized in Table 3 below.

TABLE 3

Hydrogenation properties, discharge capacities and microstructures of Ti—V—Mn—Ni and Ti—Zr—V—Mn—Ni alloy systems

| Alloy system | Hydrogen-absorbing capacity (wt. %) | Equilibrium pressure (atm) | Discharge capacity (mAh/g) | BCC/C14 phase ratio |
|---|---|---|---|---|
| $Ti_{0.4}V_{0.2}Mn_{0.2}Ni_{0.2}$ | 0.95 | 0.5–1.5 | 204 | 0.85 |
| $Ti_{0.4}Zr_{0.05}V_{0.2}Mn_{0.2}Ni_{0.2}$ | 1.42 | 0.3–0.6 | 372 | 0.09 |
| $Ti_{0.3}Zr_{0.05}V_{0.2}Mn_{0.2}Ni_{0.2}$ | 1.32 | 0.4–0.6 | 335 | 0.22 |
| $Ti_{0.2}V_{0.4}Mn_{0.2}Ni_{0.2}$ | 1.06 | 0.7–1.6 | 227 | 0.73 |
| $Ti_{0.2}Zr_{0.05}V_{0.4}Mn_{0.2}Ni_{0.15}$ | 1.52 | 0.03–0.4 | 393 | 0.05 |
| $Ti_{0.2}Zr_{0.05}V_{0.4}Mn_{0.15}Ni_{0.2}$ | 1.5 | 0.1–0.3 | 390 | 0.06 |

As can be seen in Table 3, it was found that the hydrogen-absorbing capacity increased and hydrogen equilibrium pressure was controlled at a range of 0.01 to 1 atm at room temperature, when Ti element in the Ti—V—Mn—Ni alloy system was substituted partially with Zr element as the 5th element, or a small amount of Zr element was added to the alloys. As shown in FIGS. 1(A), 1(B) and 1(C) showing X-ray diffraction patterns, the said improvement resulted from a re-decrease of BCC phase and an increase of lattice size.

Example 1

Hydrogen-absorbing Ti—Zr—V—Mn—Ni-M alloy system

Based on the results obtained in Reference Example 3 that an alloy having low BCC phase and high C14-hexagonal Laves phase, like Ti—Zr—V—Mn—Ni alloy system, has good hydrogenation properties and a high discharge capacity, Ti—Zr—V—Mn—Ni alloy system which was modified to have optimum composition and Ti—Zr—V—Mn—Ni—M alloy system which was prepared by adding the 6th and 7th elements to the Ti—Zr—V—Mn—Ni alloy system were prepared, respectively. Then, changes in the crystalline structure, hydrogenation properties and discharge capacities were investigated, whose results were summarized in Table 4 below.

TABLE 4

Hydrogen-absorbing capacities, discharge capacities and lattice constants of hydrogen-absorbing Ti—Zr—V—Mn—Ni and Ti—Zr—V—Mn—Ni—M alloy systems

| Hydrogen-absorbing Zr—V—Mn—Ni—M alloy system (M: Cr, Co, Fe, Cu, Al, Si, Hf, Nb, Mo and R.E.) | | | | | | Solid-gas reaction Hydrogen-absorbing capacity | Electro-chemical reaction Discharge capacity | Lattice constant | |
|---|---|---|---|---|---|---|---|---|---|
| Ti | Zr | V | Mn | Ni | M | | | | |
| (at. %) | (at. %) | (at. %) | (at. %) | (at. %) | (at. %) | (wt. % H/alloy g) | (mAh/g) | a(Å) | c(Å) |
| 20 | 13 | 20 | 17 | 30 | 0 | 1.9 | 485 | 4.946 | 8.060 |
| 20 | 14 | 20 | 11 | 35 | 0 | 1.77 | 464 | 4.925 | 8.019 |
| 20 | 4 | 40 | 15 | 15 | 5(Co) | 1.7 | 451 | 4.921 | 8.034 |
| 23 | 10 | 20 | 17 | 30 | 0 | 1.8 | 477 | 4.910 | 8.032 |
| 26 | 7 | 24 | 20 | 23 | 0 | 1.58 | 407 | 4.902 | 8.012 |
| 26 | 7 | 24 | 10 | 20 | 10(Cr) | 1.8 | 475 | 4.94 | 8.052 |
| 26 | 7 | 24 | 10 | 25 | 5(Hf, Mo,Nb) | 1.6–1.65 | 410–416 | 4.925 ± 0.01 | 8.033 ± 0.01 |
| 27 | 7 | 17 | 17 | 32 | 0 | 1.7 | 449 | 4.920 | 8.013 |
| 27 | 7 | 18 | 17 | 31 | 0 | 1.73 | 454 | 4.918 | 8.008 |
| 27 | 7 | 21 | 14 | 27 | 4(Cr) | 1.8 | 465 | 4.928 | 8.028 |
| 27 | 7 | 21 | 14 | 27 | 4(Co) | 1.63 | 423 | 4.931 | 8.041 |
| 27 | 7 | 21 | 14 | 27 | 4(Cu) | 1.56 | 403 | 4.916 | 7.988 |
| 27 | 7 | 21 | 14 | 27 | 4(Al, Si) | 1.5–1.51 | 400–405 | 4.942 ± 0.01 | 8.044 ± 0.01 |
| 27 | 7 | 21 | 14 | 27 | 4(Fe) | 1.55 | 406 | 4.945 | 8.029 |
| 27 | 7 | 20 | 13 | 27 | 6(Co) | 1.75 | 456 | 4.924 | 8.020 |
| 28 | 7 | 22 | 18 | 25 | 0 | 1.82 | 481 | 5.004 | 8.168 |
| 28 | 7 | 20 | 15 | 25 | 5 (R.E.) | 1.74–1.77 | 450–460 | 4.945 ± 0.01 | 8.037 ± 0.01 |
| 28 | 7 | 22 | 10 | 25 | 8(Cr) | 1.88 | 495 | 4.93 | 8.036 |
| 28 | 7 | 22 | 10 | 25 | 8(Al) | 1.65 | 430 | 4.925 | 8.022 |
| 30 | 3 | 17 | 17 | 33 | 0 | 1.51 | 400 | 4.913 | 8.003 |
| 30 | 3 | 20 | 17 | 30 | 0 | 1.7 | 450 | 4.898 | 7.972 |
| 35 | 4 | 18 | 30 | 13 | 0 | 1.63 | 426 | 4.932 | 8.060 |
| 35 | 5 | 15 | 20 | 20 | 15(Cr) | 1.54 | 400 | 4.912 | 8.027 |

Figure 2:
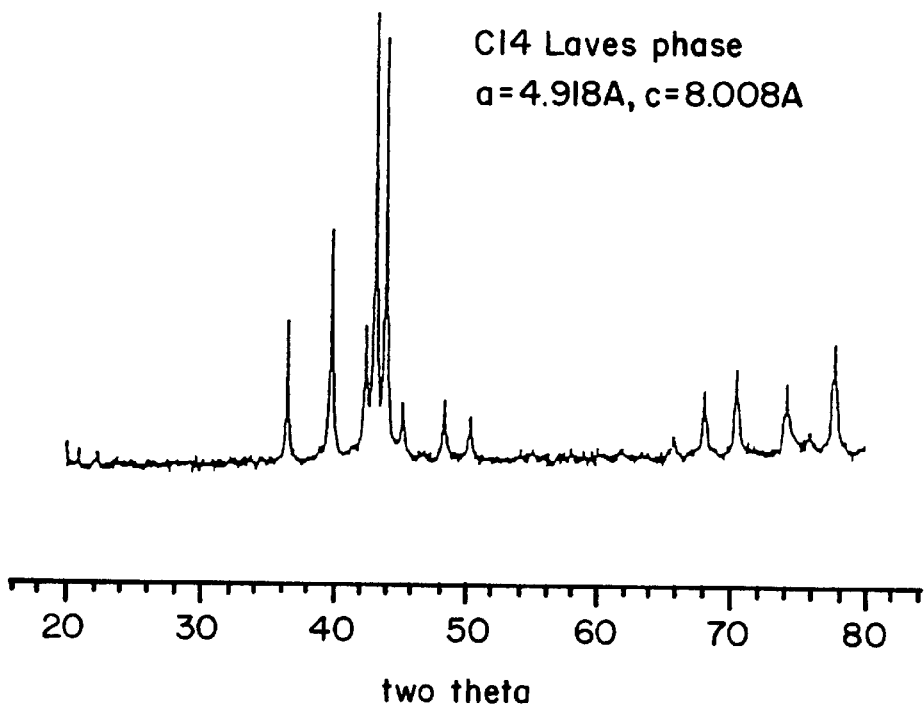
FIG. 2 is a graph showing X-ray diffraction pattern for $Ti_{0.26}Zr_{0.07}V_{0.15}Mn_{0.2}Ni_{0.34}$ alloy system.

As can be seen in Table 4, it was found that Ti—Zr—V—Mn—Ni alloy system or Ti—Zr—V—Mn—Ni—M alloy system(M=Cr, Co, Fe, Cu, Al, Si, Hf, Nb, Mo and R.E. (the rare-earth elements such as La, Ce, Pr, Nd and Sm)) of the invention had C14-hexagonal crystalline structures of single phase and discharge capacities of 400 mAh/g or more. FIG. 2 shows X-ray diffraction pattern for $Ti_{0.26}Zr_{0.07}V_{0.15}Mn_{0.2}Ni_{0.34}$ alloy system, which is a preferred embodiment of the invention, which confirms that the alloy had C14-hexagonal crystalline structure of single phase.

As clearly illustrated and demonstrated above, Ti—Zr—V—Mn—Ni—M alloy system of the invention, comprises basic elements of Ti, Zr, V, Mn and Ni and at least one optional element such as Cr, Co, Fe, Cu, Al, Si, Hf, Nb, Mo and R.E.(the rare-earth elements such as La, Ce, Pr, Nd and Sm)) as the 6th and 7th elements in an amount of 0 to 10 at. %. The alloy system has low molar molecular weight of 50 to 65 g/mol, C14-hexagonal crystalline structure of single phase, lattice constant of a: 4.902–5.004 Å and c: 7.972–8.168 Å, ultra high discharge capacity of 400 mAh/g or more, which can be employed as an anode material of a Ni—MH secondary battery.

What is claimed is:

1. A hydrogen-absorbing Ti-based alloy having C14-hexagonal crystalline structure of single phase, which is represented as a following general formula (I):

$$Ti_A Zr_B V_C Mn_D Ni_E \qquad (I)$$

wherein,
A, B, C, D and E have atomic ratios ranging 0.2≦A≦0.35, 0.03≦B≦0.15, 0.2≦C≦0.4, 0.08≦D≦0.2 and 0.13≦E≦0.35,
with the proviso that A+B+C+D+E=1 and A+B≦0.45.

2. The hydrogen-absorbing Ti-based alloy of claim 1 which is selected from the group consisting of:

$Ti_{0.26}Zr_{0.07}V_{0.24}Mn_{0.20}Ni_{0.23}$ or
$Ti_{0.28}Zr_{0.07}V_{0.22}Mn_{0.18}Ni_{0.25}$.

3. A hydrogen-absorbing Ti-based alloy having C14-hexagonal crystalline structure of single phase, which is represented as a following general formula (II):

$$Ti_A Zr_B V_C Mn_D Ni_E M_F \qquad (II)$$

wherein,
M represents at least one metal which is selected from the group consisting of Cr, Co, Fe, Cu, Al, Si, Hf, Nb, Mo and R.E. (rare-earth elements); and,
A, B, C, D, E and F have atomic ratios ranging 0.2≦A≦0.35, 0.03≦B≦0.15, 0.2≦C≦0.4 0.08≦D≦0.2 and 0.13≦E≦0.35 and 0≦F≦0.1, respectively,
with the proviso that A+B+C+D+E+F=1 and A+B≦0.45.

4. The hydrogen-absorbing Ti-based alloy of claim 3 which is selected from the group consisting of $Ti_{0.20}Zr_{0.04}V_{0.40}Mn_{0.15}Ni_{0.15}Co_{0.05}$;
$Ti_{0.26}Zr_{0.07}V_{0.24}Mn_{0.10}Ni_{0.20}Cr_{0.10}$;
$Ti_{0.26}Zr_{0.04}V_{0.24}Mn_{0.10}Ni_{0.25}Hf_{0.05}$;

$Ti_{0.26}Zr_{0.07}V_{0.24}Mn_{0.10}Ni_{0.25}Mo_{0.05}$;
$Ti_{0.26}Zr_{0.07}V_{0.24}Mn_{0.10}Ni_{0.25}Nb_{0.05}$;
$Ti_{0.27}Zr_{0.07}V_{0.21}Mn_{0.14}Ni_{0.27}Cr_{0.04}$;
$Ti_{0.27}Zr_{0.07}V_{0.21}Mn_{0.14}Ni_{0.27}Co_{0.04}$;
$Ti_{0.27}Zr_{0.07}V_{0.21}Mn_{0.14}Ni_{0.27}Cu_{0.04}$;
$Ti_{0.27}Zr_{0.07}V_{0.21}Mn_{0.14}Ni_{0.27}Al_{0.04}$; and,
$Ti_{0.27}Zr_{0.07}V_{0.21}Mn_{0.14}Ni_{0.27}Si_{0.04}$.

$Ti_{0.27}Zr_{0.07}V_{0.21}Mn_{0.14}Ni_{0.27}Fe_{0.04}$;
$Ti_{0.27}Zr_{0.07}V_{0.21}Mn_{0.13}Ni_{0.27}Co_{0.06}$;
$Ti_{0.28}Zr_{0.07}V_{0.20}Mn_{0.15}Ni_{0.25}R.E._{0.05}$;
$Ti_{0.28}Zr_{0.07}V_{0.22}Mn_{0.10}Ni_{0.25}Cr_{0.04}$; and,
$Ti_{0.28}Zr_{0.07}V_{0.22}Mn_{0.10}Ni_{0.25}Al_{0.08}$.

\* \* \* \* \*